(12) United States Patent
Wilson

(10) Patent No.: US 7,000,025 B1
(45) Date of Patent: Feb. 14, 2006

(54) METHODS FOR CONGESTION MITIGATION IN INFINIBAND

(75) Inventor: Andrew W. Wilson, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 700 days.

(21) Appl. No.: 10/141,147

(22) Filed: May 7, 2002

Related U.S. Application Data

(60) Provisional application No. 60/289,652, filed on May 7, 2001.

(51) Int. Cl.
*G06F 15/16* (2006.01)

(52) U.S. Cl. .................... 709/235; 709/226
(58) Field of Classification Search ........ 709/224–226, 709/240–235; 370/230, 231, 235, 402, 229; 710/317; 702/186
See application file for complete search history.

(56) References Cited

U.S. PATENT DOCUMENTS

| | | | | | |
|---|---|---|---|---|---|
| 5,029,164 | A | * | 7/1991 | Goldstein et al. | 370/235 |
| 5,274,782 | A | * | 12/1993 | Chalasani et al. | 710/317 |
| 5,367,523 | A | * | 11/1994 | Chang et al. | 370/235 |
| 5,442,630 | A | * | 8/1995 | Gagliardi et al. | 370/402 |
| 5,574,861 | A | * | 11/1996 | Lorvig et al. | 709/229 |
| 5,675,742 | A | * | 10/1997 | Jain et al. | 709/226 |
| 6,161,138 | A | * | 12/2000 | Gross et al. | 709/225 |
| 6,304,549 | B1 | * | 10/2001 | Srinivasan et al. | 370/230 |
| 6,327,550 | B1 | * | 12/2001 | Vinberg et al. | 702/186 |
| 6,564,214 | B1 | * | 5/2003 | Bhide | 707/6 |
| 6,690,646 | B1 | * | 2/2004 | Fichou et al. | 370/231 |
| 2002/0095495 | A1 | * | 7/2002 | Otsuka et al. | 709/224 |
| 2003/0021230 | A1 | * | 1/2003 | Kuo et al. | 370/230 |

OTHER PUBLICATIONS

RFC 2475; www.ietf.org/rfc/rfc2475.txt.*
TCP Performance Implications of Network Asymetry; www.ietf.org/proceeding/99nov/I-D/draft-ietf-pilc-asym-00.txt.*
Practical Network Support for IP Traceback—Savage, Wetherall, Karlin . . . (2000) www.stanford.edu/class/cs244b/pdf/sigcomm2000-8-4.pdf.*
Improving Explicit Congestion Notification with the . . . —Chunlei Liu Raj (2000) www.cse.ohio-state.edu/~jain/papers/ftp/ecnfront.pdf.*

* cited by examiner

*Primary Examiner*—Thong Vu
(74) *Attorney, Agent, or Firm*—Martine Penilla & Gencarella, LLP

(57) ABSTRACT

A method for optimizing data transmission in a data transfer system is provided where the data transfer system includes a transmitting device that transmits data to a receiving device through a switch. The method includes monitoring data transfer congestion in a buffer of the switch. The monitoring includes marking the data when data transfer congestion is detected. If data transfer congestion is detected, the method includes marking an acknowledgement (ACK) data after the marked data is received by the receiving device. The method further includes transmitting the ACK data from the receiving device to the transmitting device. The method also includes adjusting a data transfer rate between the transmitting device and the receiving device based on data transfer congestion. Monitoring data transfer congestion includes marking the data according to a probability corresponding to a percentage of time that the buffer is full.

23 Claims, 12 Drawing Sheets

METHODS FOR CONGESTION MITIGATION IN INFINIBAND

CROSS REFERENCE TO RELATED APPLICATION

This is a non-provisional application claiming priority from a U.S. Provisional Application No. 60/289,652 entitled "CONGESTION MITIGATION IN INFINIBAND", filed on May 7, 2001. The aforementioned provisional application is hereby incorporated by reference.

BACKGROUND OF THE INVENTION

1. Field of the Invention

This invention relates generally to the field of computing technology and more particularly concerns the reducing of congestion in Infiniband-based data transmission systems.

2. Description of the Related Art

Typically, in the computing industry, data may be transferred over several different types of networks such as the Internet, Local Area Networks (LAN), Wide Area Networks (WAN), Storage Area Networks (SAN), etc. Typically, data transferred over these types of networks may involve utilization of data transfer protocols such as, for example, transmission control protocol (TCP) and an internet protocol (IP).

Through use of the TCP, data that is sent over a network is broken up into little pieces for transmission and reassembled once the data reaches its destination. Data may be sent in the form such as, for example, data packets, etc. Depending on the interface used, the TCP may break down data into a variety of data packet sizes such as 128 byte packets. The TCP includes its own information which allows the data to be reattached in the correct order as well as resending any data that happens to get "dropped" (data that is lost due to various reasons such as congestion over the network). IP routes the data packaged by the TCP to a destination such as a device within a network.

As originally designed, the TCP protocol was intended to be a very fault tolerant protocol that could withstand catastrophic failures of the communication network. TCP was also designed with long range communication and messaging in mind. As a result, TCP is inherently a protocol that has high overhead for handling the communication of variable length segments. New transport media and methods are now available which avoids the need for complicated packet loss tolerant protocols such as TCP especially when data transfer is utilized over short range communication. Infiniband is one of the new data transport architectures that utilizes link level control to efficiently send data in a coherent manner. Although Infiniband is a promising data transport architecture, congestion control for Infiniband is ineffective in many situations. Therefore, a method is needed to improve congestion control in Infiniband.

The Infiniband architecture is based on usage of a computer interconnect fabric that utilizes a unified fabric and provides a mechanism to share I/O interconnects among many servers. The Infiniband architecture typically creates a more efficient way to connect storage and communications networks and server clusters together, while delivering an efficient I/O infrastructure. The Infiniband architecture is based on channel I/O. Infiniband channels are created by attaching host adapters and target adapters through Infiniband switches. This interconnect infrastructure is called a "fabric," based on the way input and output connections are constructed between target adapters and sending adapters. All Infiniband connections are created with Infiniband links, starting at data rates of 2.5 Gbps and utilizing both copper wire and fiber optics for transmission.

Infiniband features link level flow control that in certain few circumstances can reduce congestion caused packet loss and decrease the need for complicated, packet loss tolerant protocols such as TCP. Unfortunately, in many circumstances, link level flow control cannot prevent congestion due to a condition known as congestion spreading. Congestion spreading occurs when backups on overloaded links or nodes curtail traffic in other, otherwise unaffected paths. This curtailing of unaffected paths by overloaded links is typically known as head of line blocking.

FIG. 1A shows a simplified Infiniband data transmission system 10. System 10 includes an Infiniband sender 12 that transmits data to a switch 14. The data is then sent to a receiver 16. In such a simplified system, head of line blocking and other types of data transfer congestion rarely exists because only one link exists. Unfortunately, in real life network architectures, such a simplified system is not typically utilized.

Typically, when an output port of a switch runs out of buffers, the link level flow control will then apply back pressure to the input port of the switch to shut off further traffic. If the output port of a switch is full, then the input ports with packets for the affected output port will also shut down, possibly stranding packets destined for other output ports. This effect is known as "head of line" blocking, and is the mechanism through which congestion spreads to otherwise non-congested paths. Data transfer congestion can occur in numerous other types of switch configurations as well.

FIG. 1B shows another example of a congested Infiniband system 20. At the instance in time shown, much of the traffic is destined to host-0 28 which is connected to an output port-16 34 of a switch 26. Because more packets are headed to the switch 26 than the host link can carry, the port-16 buffers fill up and exert back pressure 40 on all the input ports carrying host-0 28 bound data from a storage unit-0 22. In particular, when a packet headed for host-0 28 reaches the head-of-queue position in a buffer of an input port-0 30, it is held because no room is available in the buffers of output port-16 34. This blocks other traffic in input port-O's queue which might be headed for other hosts such as, for example, hosts 31 and 32, whose links are not congested. Hence, the packet rate for host-1 31 and the host-2 32 is also reduced, even though they are not part of the original congestion. Consequently, in prior art systems, head of line blocking and/or input buffer congestion results in data transport congestion thereby dramatically reducing data transmission efficiency of the system.

In view of the foregoing, what is needed is a new and improved methodology for reducing congestion during data transfer and storage which utilizes Infiniband data transport architecture. Such an approach would take advantage of the full data transfer capabilities in the transmission media of the Infiniband architecture, and significantly reduce head of line blocking to optimize data transfer throughput.

SUMMARY OF THE INVENTION

Broadly speaking, the present invention fills these needs by providing computer implemented methods for reducing of congestion in Infiniband architecture based data transport systems.

In one embodiment, a method for optimizing data transmission in a data transfer system is provided where the data transfer system includes a transmitting device that transmits data to a receiving device through a switch. The method includes monitoring data transfer congestion in a buffer of the switch. The monitoring includes marking the data when data transfer congestion is detected. If data transfer congestion is detected, the method includes marking an acknowledgement (ACK) data after the marked data is received by the receiving device. The method further includes transmitting the ACK data from the receiving device to the transmitting device. The method also includes adjusting a data transfer rate between the transmitting device and the receiving device based on data transfer congestion. Monitoring data transfer congestion includes marking the data according to a probability corresponding to a percentage of time that the buffer is full.

In another embodiment, a method for optimizing data transmission in a data transfer system is provided where the data transfer system includes a transmitting device that transmits data to a receiving device through a switch. The method includes monitoring data transfer congestion in a buffer of the switch. The monitoring includes marking the data when data transfer congestion is detected. If data transfer congestion is detected, the method includes marking an acknowledgement (ACK) data after the marked data is received by the receiving device. The method further includes transmitting the ACK data from the receiving device to the transmitting device. The method also includes adjusting a data transfer rate between the transmitting device and the receiving device based on data transfer congestion. The adjusting a data transfer rate includes increasing the data transfer rate when the ACK data is not marked and decreasing the data transfer rate when the ACK data is marked. Decreasing the data transfer rate is defined by using the following equation: CRL'=actual rate−K*(rate of packets covered by ACK), where CRL' is a new congestion rate limit and actual rate is an actual rate of issue of data.

In yet another embodiment, a method for optimizing data transmission in a data transfer system is provided where the data transfer system includes a transmitting device that transmits data to a receiving device through a switch. The method includes monitoring data transfer congestion in a buffer of the switch. The monitoring includes marking the data when data transfer congestion is detected and the monitoring also includes marking the data according to a probability corresponding to a percentage of time that the buffer is full. If data transfer congestion is detected, the method marks an acknowledgement (ACK) data after the marked data is received by the receiving device. The method also includes transmitting the ACK data from the receiving device to the transmitting device. If the ACK data is marked, the method decreases a data transfer rate multiplicatively between the transmitting device and the receiving device. If the ACK data is unmarked, the method increases the data transfer rate additively between the transmitting device and the receiving device. Decreasing the data transfer rate is defined by using the following equation: CRL'=actual rate−K*(rate of packets covered by ACK).

In another embodiment, a method for optimizing data transmission in a data transfer system is provided where the data transfer system includes a transmitting device that transmits data to a receiving device through a switch. The method includes monitoring data transfer congestion in a buffer of the switch. The monitoring includes marking the data when data transfer congestion is detected and the monitoring also includes marking the data according to a probability corresponding to a percentage of time that the buffer is full. If data transfer congestion is detected, the method marks an acknowledgement (ACK) data after the marked data is received by the receiving device. The method also includes transmitting the ACK data from the receiving device to the transmitting device. If the ACK data is marked, the method decreases a data transfer rate multiplicatively between the transmitting device and the receiving device. If the ACK data is unmarked, the method increases the data transfer rate additively between the transmitting device and the receiving device. Increasing the data transfer rate which occurs when a congestion rate limit (CRL) is greater than a slow start rate threshold (SSRT) value is defined by using the following equation: CRL'=CRL+(BR/CRL)*BR.

In yet another embodiment, a method for optimizing data transmission in a data transfer system is provided where the data transfer system includes a transmitting device that transmits data to a receiving device through a switch. The method includes monitoring data transfer congestion in a buffer of the switch. The monitoring includes marking the data when data transfer congestion is detected and the monitoring also includes marking the data according to a probability corresponding to a percentage of time that the buffer is full. If data transfer congestion is detected, the method marks an acknowledgement (ACK) data after the marked data is received by the receiving device. The method also includes transmitting the ACK data from the receiving device to the transmitting device. If the ACK data is marked, the method decreases a data transfer rate multiplicatively between the transmitting device and the receiving device. If the ACK data is unmarked, the method increases the data transfer rate additively between the transmitting device and the receiving device. Decreasing the data transfer rate is defined by the following equation: CWND'=Bytes in flight−K*(bytes covered by ACK).

In another embodiment, an Infiniband switch to be used in a network system is provided where the Infiniband switch defines a connection between a transmitting device and a receiving device. The Infiniband switch includes an input buffer for receiving data from the transmitting device. The Infiniband switch also includes an output buffer for receiving data from the input buffer and delivering the data to the receiving device. The Infiniband switch further includes firmware that has processing logic for monitoring congestion at the output buffer. The processing logic marks the data being communicated to the receiving device according to probability that congestion exists. The receiving device marks acknowledgement packets being communicated to the transmitting device when the data is marked. The transmitting device decreases data transmission rate upon receipt of marked acknowledgement packets and increases data transmission rate upon receipt of un-marked acknowledgement packets. The transmitting device decreases data transmission as defined by the following equation: CRL'=actual rate−K*(rate of packets covered by ACK).

In yet another embodiment, an Infiniband switch to be used in a network system is provided where the Infiniband switch defines a connection between a transmitting device and a receiving device. The Infiniband switch includes an input buffer for receiving data from the transmitting device. The Infiniband switch also includes an output buffer for receiving data from the input buffer and delivering the data to the receiving device. The Infiniband switch further includes firmware that has processing logic for monitoring congestion at the output buffer. The processing logic marks the data being communicated to the receiving device according to probability that congestion exists. The receiving device marks acknowledgement packets being communicated to the transmitting device when the data is marked.

The transmitting device decreases data transmission rate upon receipt of marked acknowledgement packets and increases data transmission rate upon receipt of un-marked acknowledgement packets. The transmitting device decreases data transmission as defined by the following equation: CWND'=Bytes in flight−K*(bytes covered by ACK).

The advantages of the present invention are numerous. The present invention utilizes an intelligent and powerful congestion reduction protocol to enable significant increases in data transfer efficiencies. Specifically, the present invention takes into account the actual amount of congestion within a transmission media to determine the optimal data transmission rate. By doing this, the present invention has the potent ability to both reduce congestion in a transmission media and also to take full advantage of the transmission overhead available in a transmission media. Therefore, the present invention may be used to optimize any data transmission protocol to increase and enhance data transmission efficacy.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for optimizing data transfer in Infiniband based systems. Infiniband, as indicated above, is a computer interconnect fabric using link level flow controls. Oftentimes, link level flow control does not achieve full link throughput due to congestion spreading. Congestion spreading occurs when backups on overloaded links or nodes curtail traffic in other, otherwise unaffected paths. In addition, the links may become congested even without congestion spreading. The Adaptec Explicit Congestion Notification (AECN) can work well to prevent nearly all types of data transmission congestion in an Infiniband system, allowing all paths to run at their maximum possible rates. Of course, the name used for the algorithm is not important, as is the true functionality defined herein. It will be obvious, however, to one skilled in the art, that the present invention may be practiced without some or all of these specific details. In other instances, well known process operations have not been described in detail in order not to unnecessarily obscure the present invention.

Figure 1A:
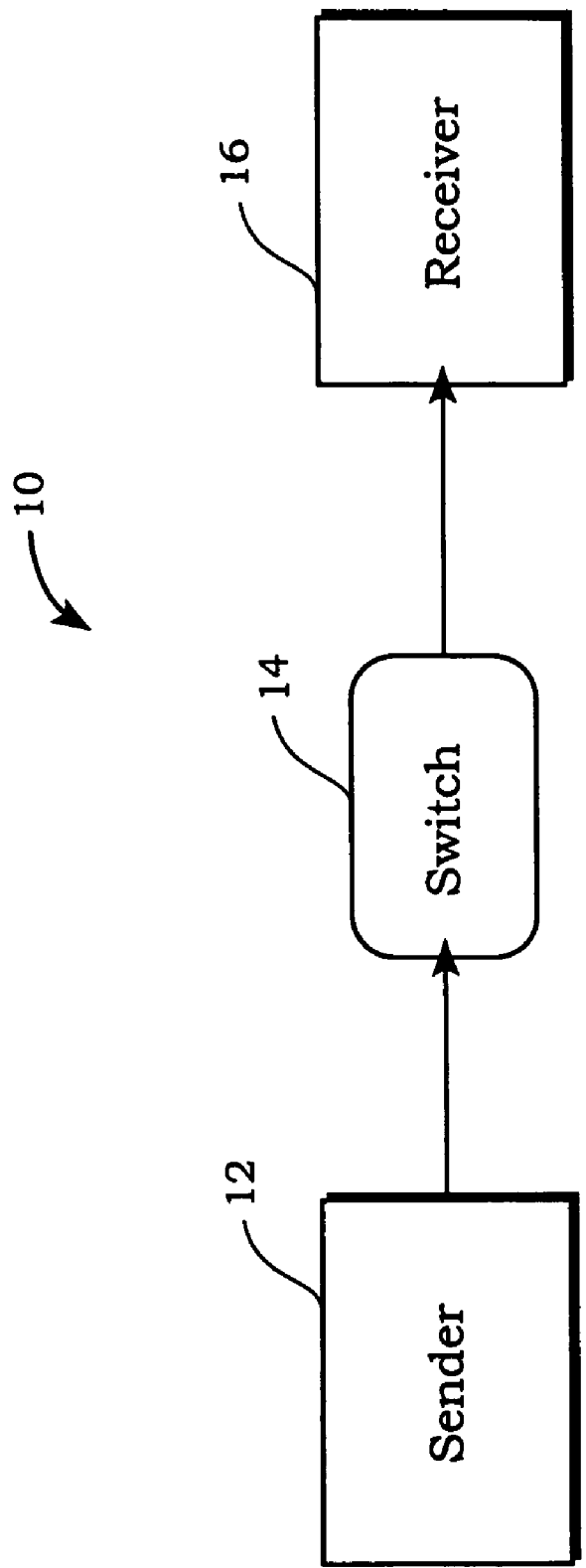
FIG. 1A shows a simplified Infiniband data transmission system.
Figure 1B:
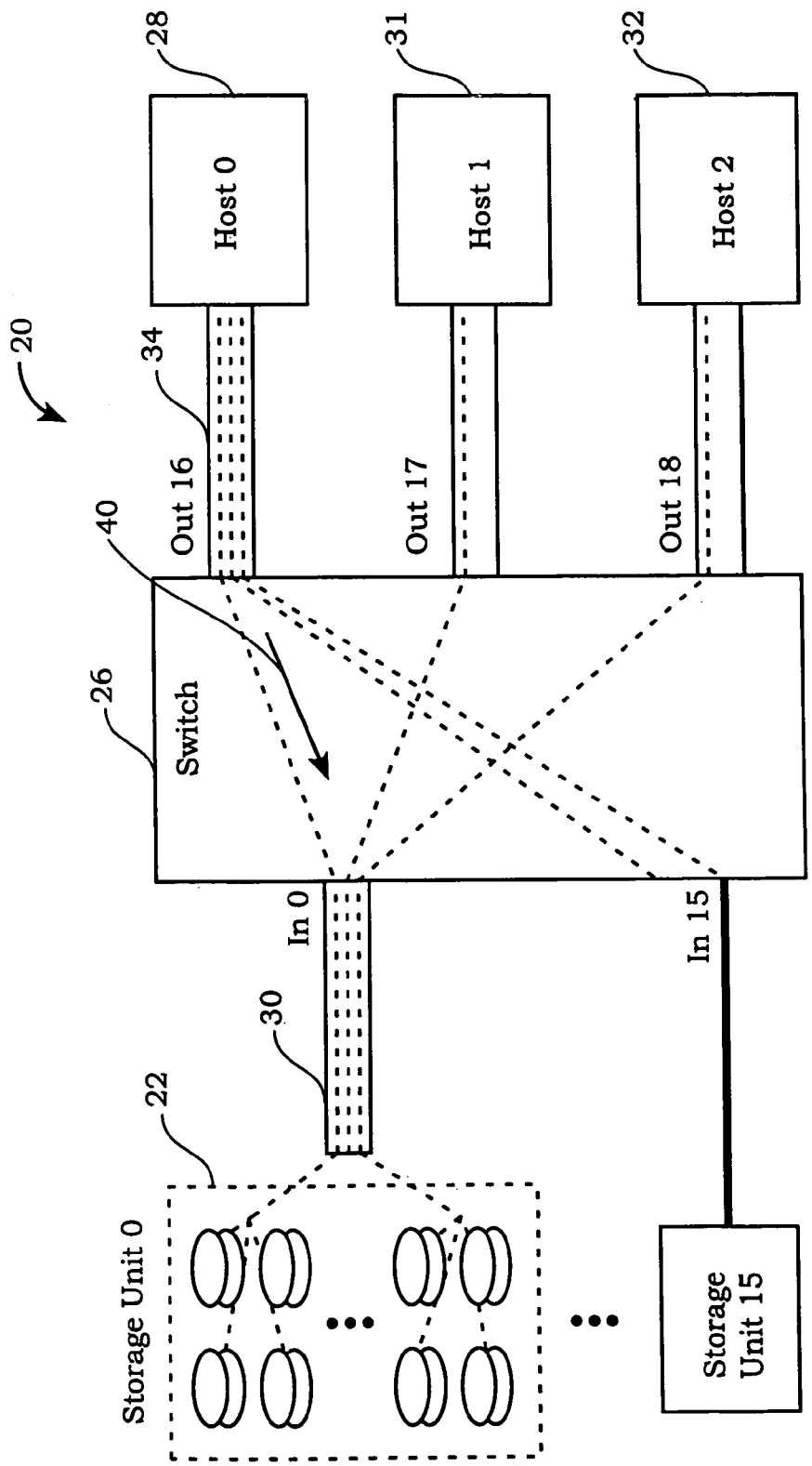
FIG. 1B shows another example of a congested Infiniband system.
Figure 2A:
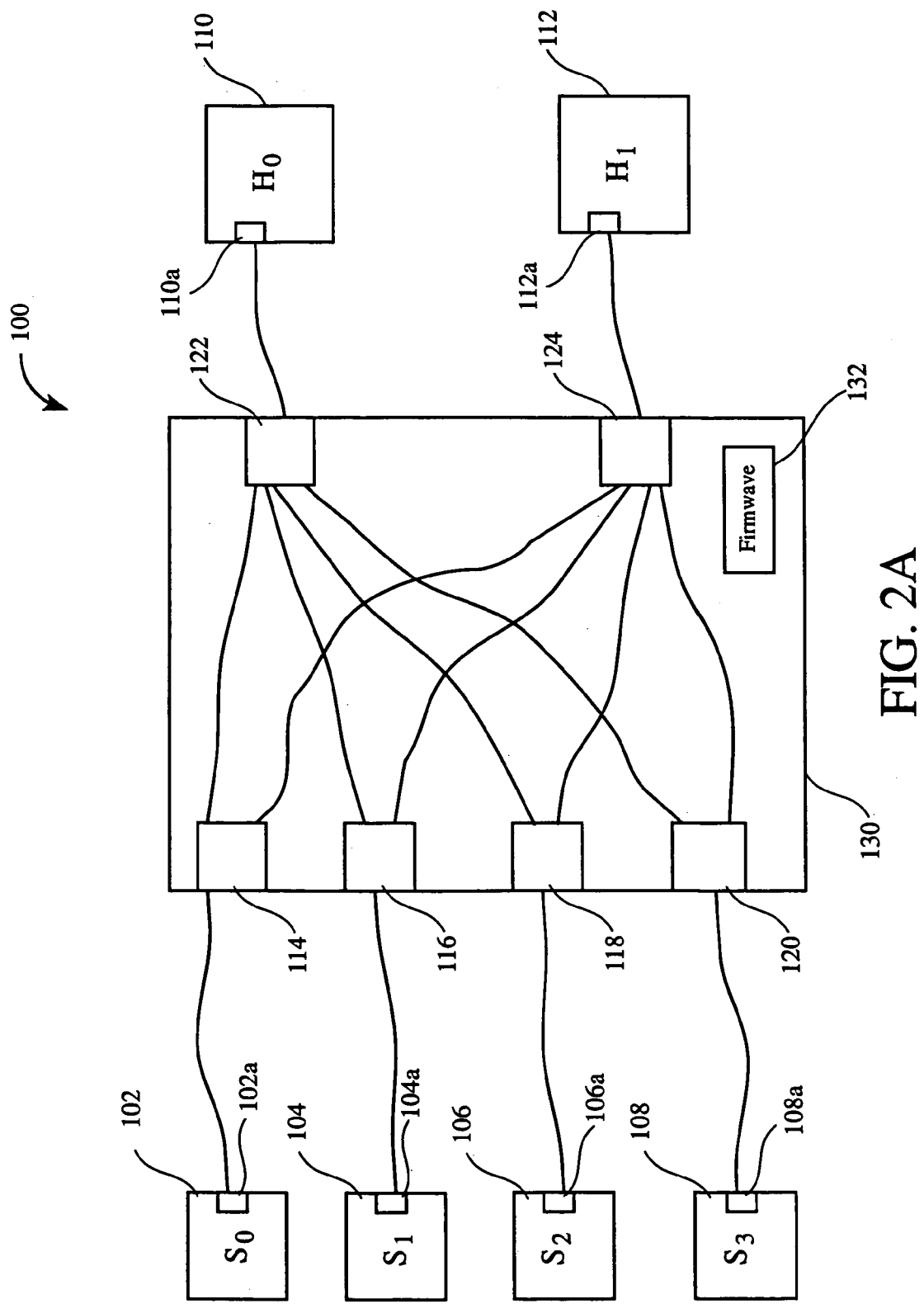
FIG. 2A shows an Infiniband transmission system in accordance with one embodiment of the present invention.

FIG. 2A shows an Infiniband transmission system 100 in accordance with one embodiment of the present invention. In this embodiment, the system 100 includes a storage unit-0 102, storage unit-1 104, a storage unit-2 106, and a storage unit-3 108. The storage units 102, 104, and 106 are connected to a switch 130 through network interface cards 102a, 104a, and 106a respectively. Each of the network interface cards 102a, 104a, 106a contains firmware which has processing logic to adjust the data transmission rate out of the respective storage devices. The switch 130 includes firmware 132 which has processing logic to monitor the input buffer and/or output buffer in the switch 130 to determine if data transfer congestion exists and to mark data if congestion exists. Although only four storage units are explicitly shown, the system 100 may include any suitable number of storage units such as, for example, 1, 2, 3, 5, 6, 7, 8, 9, 10, 11, 12, 13, 14, 15, 16, etc. configured in any suitable fashion such as for example, in a RAID array, etc. The switch 130 is also connected to a host-0 110 and a host-1 112. The host-0 110 and the host-1 112 have network interface cards 110a and 112a respectively. The network interface cards 110a and 112a each have firmware having processing logic to process received data packets and to detect marked data and to generate acknowledgements to send back to the storage units. The storage units 102, 104, 106, and 18 sends data to the switch 130 which then directs the data to the hosts 1 10 and 112. Although only two hosts are shown, any suitable numbers of hosts may be connected to the switch 130 such as, for example, 1, 3, 5, 6, 7, 8, 9, 10, etc.

The switch 130 includes input buffers 114, 116, 118, and 120 which receive data from the storage units 102, 104, 106, and 108 respectively. The switch 130 also includes output buffers 122 and 124 which each receive data from the input buffers 114, 116, 118, and 120. The output buffers 122 and 124 send data to the host-0 110 and the host-1 112 respectively. In one embodiment, the switch 130 is an Infiniband architecture switch that employs link level control.

In this embodiment, the Adaptec Explicit Congestion Notification (AECN) methodology, as described below in reference to FIGS. 3 through 10, is utilized so transmission from the storage units 102, 104, 106, and 108 to the hosts 110 and 112 are intelligently managed. With the powerful managing by the AECN methodology, one overloaded output port does not overly consume data transmission capabilities of the switch 130 at the expense of other hosts. Explained a different way, in one exemplary embodiment, if data transmission from several input buffers overload the output buffer sending data to, for example, the host 110, this would generate data congestion at the output buffer which in turn would generate data transfer congestion at one or more of the input buffers. This occurs because once the output buffers are full, then the input buffers cannot send data to the output buffer thereby filling up the input buffers with data being received from, for example, the target host. Therefore, data transfer from the target host to the input buffers are regulated by monitoring the capacity of the output buffers. Therefore, head of line blocking does not take place in the system 100, and other hosts such as, for example, the host 112 can receive data even when the host 110 has requested data transmission that would typically overload the switch 130. It should be understood that other exemplary switches may be utilized which do not have first in first out output buffers but instead have RAM for output buffers. In those systems, input buffers may still become congested because when output buffers cannot send out data fast enough, the output buffers may become full in which case, the input buffers cannot send data to the output buffer resulting in full input buffers. The methods described herein may also be utilized in those circumstances to regulate data transmission so data congestion is reduced or eliminated. Therefore, the AECN methodology may be implemented with any suitable switch configuration to optimize data transmission.

Figure 2B:
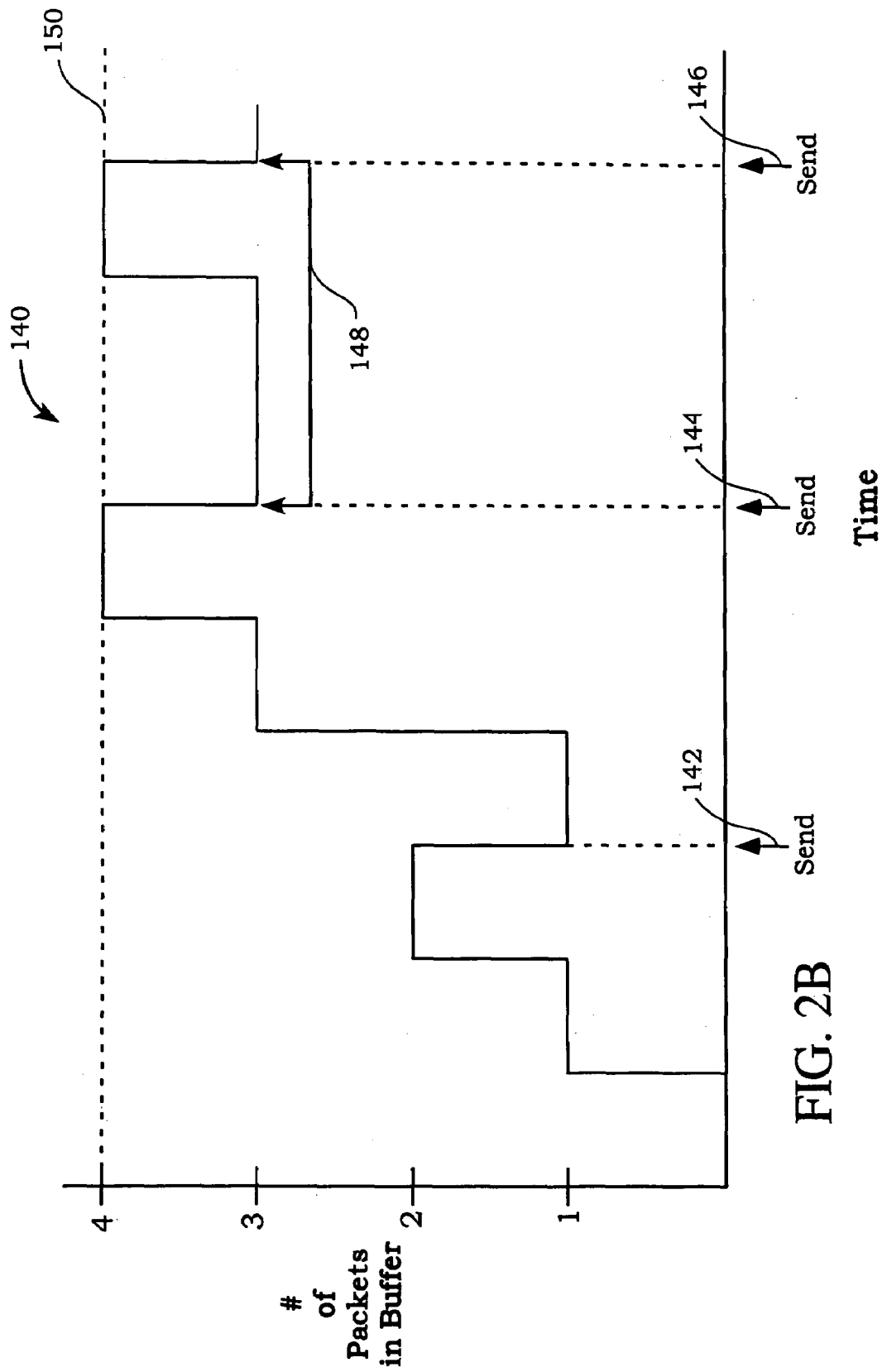
FIG. 2B shows a graph depicting the data input and data output that takes place in an Infiniband switch in accordance with one embodiment of the present invention.

FIG. 2B shows a graph 140 depicting the data input and data output that takes place in an Infiniband switch in accordance with one embodiment of the present invention. In this embodiment, the graph 140 has as its y-axis the number of packets that are in, for example, the output buffer 122 during a data transmission sequence, and the x-axis of the graph 140 depicts time progression. In this embodiment, the graph 140 tracks data packets that are received by the output buffer 122 and data packets that are sent out of the output buffer 122. In this exemplary embodiment, the output buffer 122 has a maximum data packet capacity of 4 as shown by capacity line 150, but it should be understood that the buffers (both input and output) as utilized herein may have a capacity of any suitable number of data packets. It should be understood that although packets are utilized as units but other buffers may be measured in other units like bytes. In another embodiment, buffer capacity measurement may be measured in units such as, for example, bytes of data. The graph 140 shows that as time progresses, data packets are received by the output buffer 122 which increases the number of data packets within the output buffer 122. At send times 142, 144, and 146, data packets are sent out of the output buffer 122. As discussed in further detail in reference to FIG. 4, a set time period 148 is the reference time period during which a percentage of time that the output buffer is at capacity is calculated. It should be understood that whether a buffer is "at capacity" or "full" may be established by determining whether the buffer is at or above a certain set percentage filled. In one embodiment, the buffer is full or at capacity when the buffer is above 50% filled. In another embodiment, the buffer is full or at capacity when the buffer is above 80% filled. In yet another embodiment, the buffer is full or at capacity when the buffer is above 90% full. In the exemplary data transmission depicted in the graph 140, the output buffer is full about 33% of the set time period 148, therefore, the next data packet sent from the output buffer to an Infiniband host at the send time 146 will have a 33% probability that it will be marked indicating possible congestion in the output buffer. In this embodiment, the output buffer 122 is monitored so back pressure from the output buffer 122 to the input buffer 114 does not cause data transmission congestion in the input buffer 114. In this way, possible data congestion may be detected and the data transfer rate into the input buffer 114 may be regulated to prevent congestion spreading in a switch. If larger buffers are utilized that can hold more packets than typical Infiniband buffers, congestion may be established by determining if the buffer is full or almost full as opposed to determining how long the buffer is full. In such an embodiment, the probability of marking the data corresponds to the percentage that the buffer is full. For example, in this embodiment, if the buffer is 70% full then there is a 70% probability that the next data packet sent will be marked. In another embodiment, congestion in the switch may be determined by a hybrid method through monitoring of both how full the buffer is and how long the buffer is full. Therefore, any suitable way of determining congestion may be utilized.

In another exemplary embodiment, a buffer in the input buffer 114 may be monitored for time at full capacity in the same way that the output buffer 122 is described as being monitored above. Therefore, a percentage of time that the buffer in the input buffer 114 is at full capacity may be determined for a specified period of time and the percentage is used to set the probability that the next packet transmitted out of the input buffer 114 is marked. Therefore, depending on switch configuration, either the input buffer or the output buffer (or both) may be monitored for data congestion.

Figure 3:
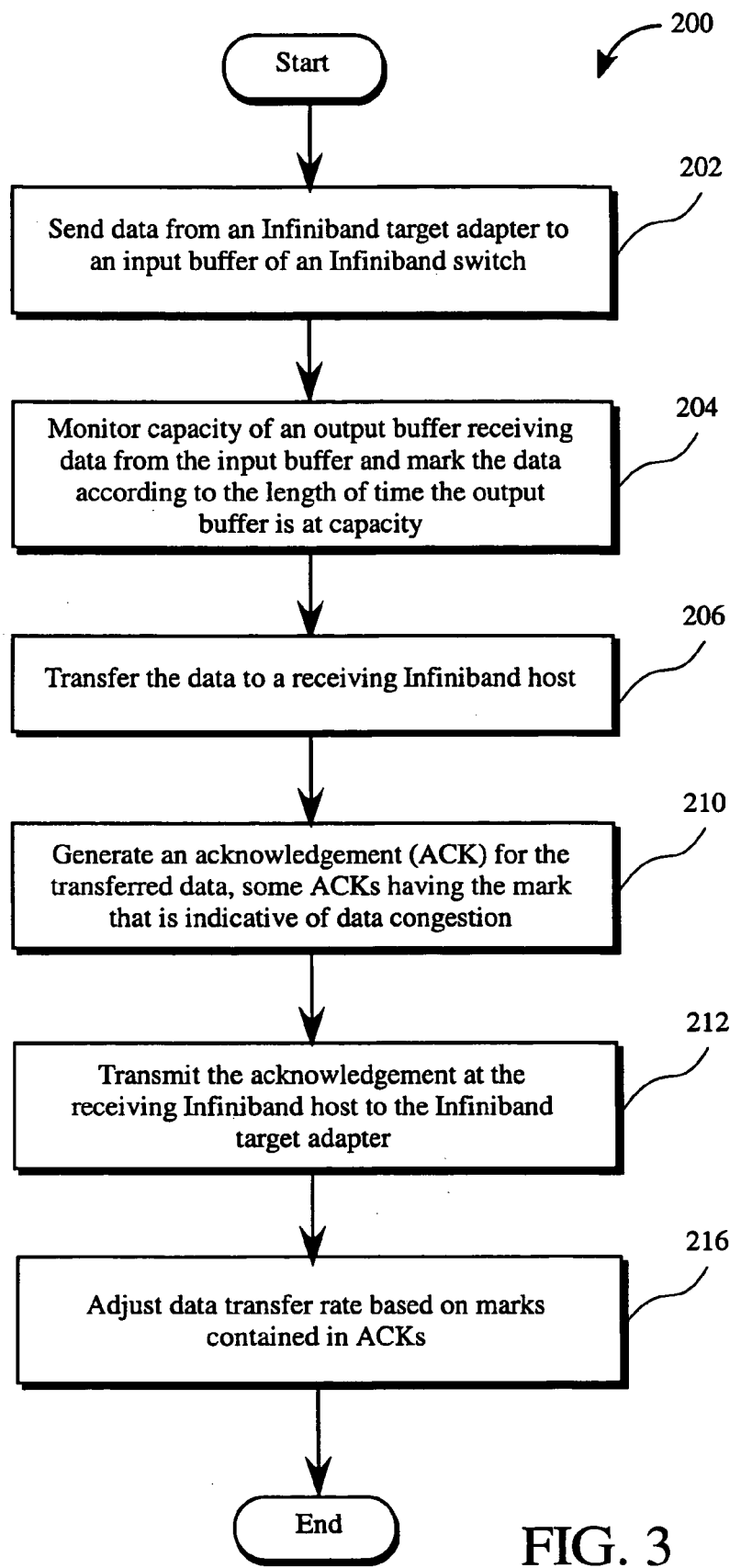
FIG. 3 shows a flowchart defining a process where congestion in an Infiniband data transmission system is reduced and data throughput is optimized in accordance with one embodiment of the present invention.

FIG. 3 shows a flowchart 200 defining a process where congestion in an Infiniband data transmission system is reduced and data throughput is optimized in accordance with one embodiment of the present invention. It should be understood that the processes depicted in flowchart 200 may be in a program instruction form written on any suitable type of computer readable media. For instance, the program instructions can be in the form of software code developed using any suitable type of programming language. The data transfer congestion reduction protocol may also be embodied in hardware form. For completeness, the process flow of FIG. 3 will illustrate an exemplary process whereby data congestion in an Infiniband data transfer system is dramatically reduced while data throughput is significantly increased.

It should be appreciated that the present invention may be utilized in any suitable Infiniband based data transfer system which has for example, a sender of data and a recipient of data, etc. It should be understood that the sender of data may be any type of device which may send data such as, for example, a target channel adapter, a switch, multiple switches, multiple target adapters, etc. It should also be appreciated that the recipient of data may be any device which may receive data such as, for example, a host adapter, multiple host adapters, etc. Therefore, one exemplary data transfer system may include a target adapter connected to a switch which is connected to a host adapter. The host adapter may also be able to send information back to the target adapter to acknowledge receipt of data. In another embodiment, as described in FIG. 2, the data transmission takes place from a storage unit connected by a switch to a host. In such a configuration, the network interface card of the storage unit may be described as the target adapter and the network interface card of the host that is the recipient of the data from the storage unit may be described as the host adapter. In one embodiment, the storage unit may also be described as a transmitting device and the host can be described as being a receiving device.

The method starts with operation 202 which sends data from an Infiniband target adapter to an input buffer of a switch. In one embodiment, the input buffer is a part of an input port of the switch and receives data from a particular Infiniband target adapter. In one embodiment, Infiniband target adapters send data to the input buffers from any suitable peripheral device such as, for example, storage devices. In operation 202, the data packet is sent from the Infiniband target adapter and received by the input buffer of the switch which controls transmission of the data packet to an Infiniband host adapter. In one embodiment, the Infiniband target adapter sends data to the input buffer at a set rate of a certain packets per round trip time (RTT). A round trip time is the amount of time required for the data packet to be sent to a target host in addition to the time required for the Infiniband target adapter to receive the acknowledgement information for the data packet. In another embodiment, a certain amount of packets are sent at various times to maintain a certain number of packet in flight. It should be understood that the present invention may be utilized in any suitable data input and transmission structure such as, for example, in a data transfer system employing one or more target channel adapters and host adapters, one or more switches, etc. In one embodiment, the switch may receive data packets from two or more Infiniband target adapters, and therefore manage data inflow from multiple Infiniband target adapters to a switch which is in turn connected to multiple host adapters. In operation 202, as data packets from the Infiniband target adapter arrive at the switch, the data packets are kept in the input buffer within the switch. It should be appreciated that the switch may also be any suitable Infiniband based architecture capable of directing data to a destination.

After operation 202, the method progresses to operation 204 where a capacity of the output buffer receiving data from the input buffer is monitored and the data is marked according to the length of time the output buffer is at capacity. In one embodiment, the output buffer is part of an output port of the switch and transmits data received from the input buffer to an Infiniband host adapter. It should be understood that depending on the switch configuration (e.g., no dedicated output buffers to particular hosts exist), the input buffer may be monitored. As the method moves from operation 202 to operation 204, the data packet at the input buffer is transmitted to the output buffer for a particular host. Because a packet sending rate of the one or more Infiniband target adapters to the switch may become greater than the data transfer rate from the switch to the target host, the output buffer may start to become full which in turn creates congestion at an input buffer. Data transmission decrease may occur for a variety of reasons such as for example, congestion within a data transfer system, a network, etc. In Infiniband systems, if the input buffer becomes full, then link flow control credits are not sent to the next device. Therefore, data packets are not sent and data congestion occurs.

The present invention prevents such data congestion while at the same time optimizing data throughput in a transmission media. It should be understood that as used herein, transmission or transfer media may be any suitable type of conduit(s) through which data transfer may occur such as, for example, a wire, network connections, connections between Infiniband hosts, connections between switches and Infiniband hosts, connections between switches and target adapters, etc.

As the buffer level is at capacity longer, the probability of the data packet being marked becomes greater which thereby increases the chances that the Infiniband target adapter is notified that the switch is experiencing possible congestion. Whether a particular data packet is marked may depend on the percentage of a certain period of time that the input buffer is full. In one embodiment, the percentage of time that the input buffer is full during a last send period is the probability that the next data packet sent will be marked. The last send period as defined herein is the current time minus the last send time. In an exemplary embodiment, if the output (or input buffer is the input buffer is being monitored) buffer is full 80% of a certain time period, there is an 80% probability that the next data packet sent to the Infiniband target adapter will be marked. It should be understood that any suitable type of mathematical correlation to the percentage that the output buffer is full may be utilized to determine the probability that the data packet will be marked such as, for example, having a probability that is double the percentage of time that the output buffer is full (e.g., percentage time full of 30% with the probability of marking being 60%), etc. The percentage probability that the next data packet sent to the Infiniband target adapter will be marked may also be known as a probability factor. Therefore, when possible data congestion is detected as determined by probability, the data is marked by the switch. It should also be understood that the data packet may be marked in any suitable location within the data packet to indicate data congestion of the switch. In one embodiment, the data packets are marked in the data packet header to indicate data transfer congestion in the switch. Operation 204 is discussed in further detail in reference to FIG. 3.

After operation 204, the method progresses to operation 206 where the data packet from the switch is transferred to a receiving Infiniband host. In this operation, the data packet is sent from the output buffer of the output port to a particular receiving Infiniband host. By use of information contained within the data packet header of the data packet, the data packet is directed through the Infiniband switch and sent to an appropriate host adapter. The receiving Infiniband host analyzes the data packet to determine if the packet is marked with congestion data.

Then the method moves to operation 210 where an acknowledgement (ACK) for the transferred data is generated where some ACK's have the mark that is indicative of data congestion. The ACK (positive acknowledgement) is typically data that is sent from the receiving Infiniband host to the Infiniband target adapter to notify the Infiniband target adapter that certain data packets have been received. Generally, an ACK is sent for every data packet or every series of data packets to indicate that data was successfully received by the host adapter. If the Infiniband target adapter does not receive an ACK for a particular data packet in a set period of time, a "time out" occurs and the data packet not ACKed is resent. It should be appreciated that the ACK may be marked in any suitable way which would show specific information regarding marked data packets. In one embodiment, if the data packet is marked, the receiving Infiniband host generates an ACK marked with the data congestion information within the ACK header. In another embodiment, a congestion control bit may be set in the ACK header to show that a particular data packet was marked. If the data packet is not marked, an unmarked ACK is generated.

After operation 210, the method advances to operation 212 where the ACKs at the receiving Infiniband host are transmitted to the Infiniband target adapter. In this way, the Infiniband target adapter can receive information regarding the success of the data transmission with respect to certain data packets. In one embodiment, by receiving ACKs from the receiving Infiniband host, the Infiniband target adapter may determine which data packets reached the receiving Infiniband host, and also if data congestion exists at the switch.

After operation 212, the method advances to operation 216 where a transfer rate of data packets is adjusted based on marks contained in the ACKs. In one embodiment, the Infiniband target adapter time stamps each data packet in computer memory and compares the time stamp of the sent data packet to the time when the acknowledgment is received for the data packet. During the round trip time (RTT), the Infiniband target adapter sends at a rate of packets allowable by the congestion rate limit register (CRL) or the number of packets allowable by a send window (CWND). The CRL is used to set the actual rate of issue of the data packets and is increased as transmission continues without marked packets. In another embodiment, the Infiniband target adapter sends data packets in certain time periods so the number of packets allowed to be in flight does not exceed a send window (CWND). Therefore, the Infiniband target adapter keeps track of the sent data packets and waits for a round trip time to be completed for each of the data packets before increasing data transmission. In one embodiment, the Infiniband target adapter waits to receive the ACK for the data packet and decreases the data transmission rate when the data packet is marked (meaning congestion exists) regardless of whether a full RTT has occurred. If, during a full RTT, none of the data packets are marked (no congestion exists), the rate of data transfer may be increased as discussed further in reference to FIG. 5.

After an acknowledgement is received and the data transfer rate is adjusted, the timer of the Infiniband target adapter is reset and the Infiniband target adapter waits to determine if the next data packet was marked or not. When the ACK for the next data packet is received, the transfer rate may be adjusted again. Therefore, the method can keep adjusting the data transfer rate to utilize the full capacity of a transmission media. It should be noted that the combination of additive increasing of the data transfer rate and multiplicative decreasing the data transfer rate satisfies fairness requirements when multiple Infiniband target adapters are sending various amounts of data. Operation 216 is explained in further detail in reference to FIG. 5. By use of the AECN, data packet transfer in Infiniband data transfer architectures may be intelligently and optimally managed so data packet dropping is reduced while at the same time increasing the maximum data throughput in any data transfer system such as for example, a network, a storage system, etc.

Figure 4:
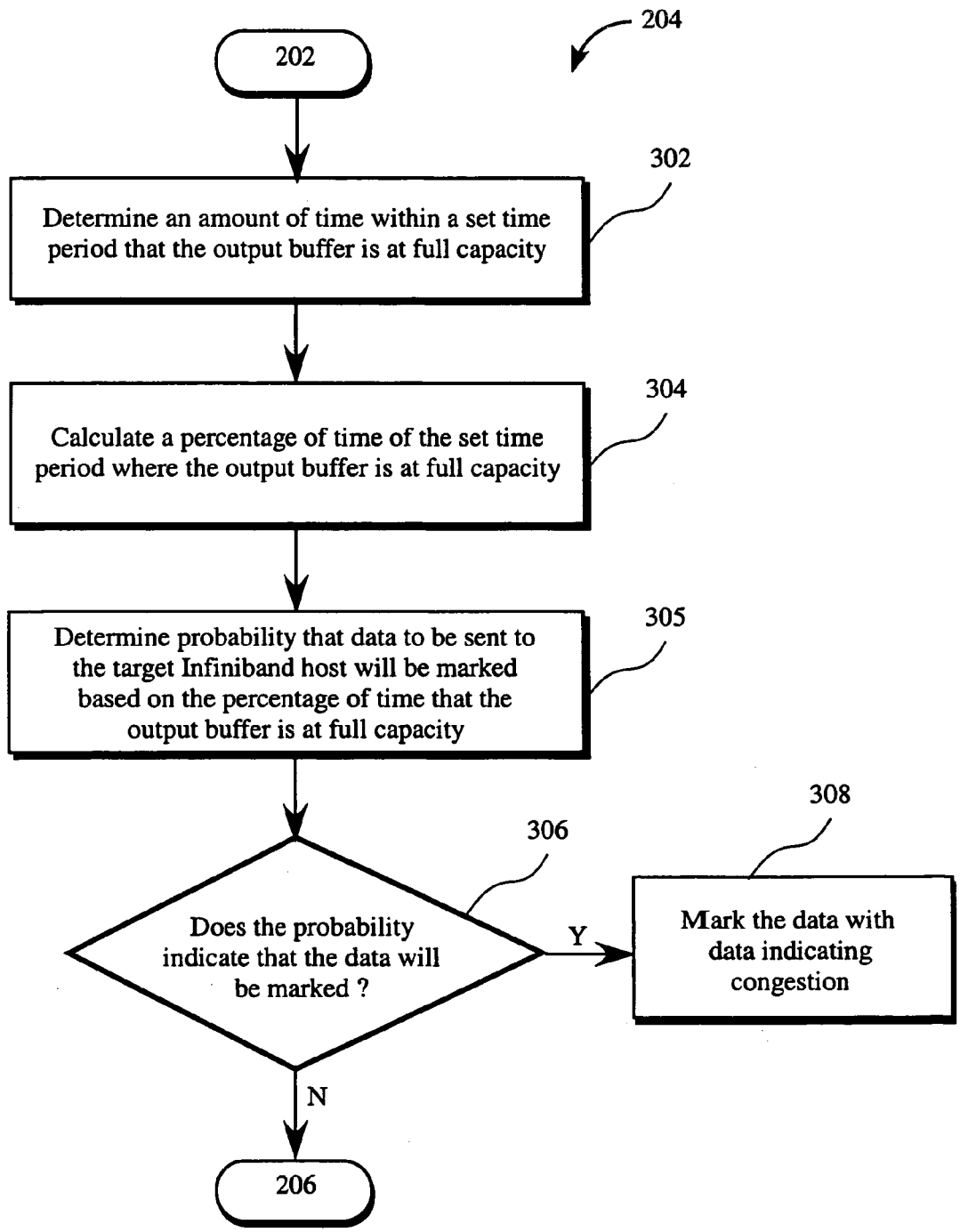
FIG. 4 shows a flowchart which illustrates the monitoring of the capacity of the output buffer receiving data from an input buffer within a switch and marking data packets according to the percentage of time that the output buffer is at capacity in accordance with one embodiment of the present invention.

FIG. 4 shows a flowchart 204 which illustrates the monitoring of the capacity of the output buffer receiving data from an input buffer within a switch and marking data packets according to the percentage of time that the output buffer is at capacity in accordance with one embodiment of the present invention. In one embodiment, the monitoring may be conducted by the firmware 132 within the switch 130. It should be appreciated that input buffer may be monitored in the same way as the output buffer described herein.

The flowchart 204 begins with operation 302 where the method determines an amount of time within a set time period that the output buffer is at full capacity. In one embodiment, the output buffer of a switch is actively monitored meaning that the output buffer is examined to determine the amount of space occupied by the data packets during the set time period. In another embodiment, if only input buffers exist in a switch, the input buffers are monitored instead of the output buffers to determine how long the input buffer is at full capacity. As indicated above in reference to FIG. 2A, the input buffer may receive data packets at a much higher rate than the output buffer in the switch can send the data packets to an Infiniband host adapter. This may happen for a variety of reasons such as transmission congestion between switches, multiple Infiniband target adapters transmitting too many data packets, or a single Infiniband target adapter sending data packets at an accelerated pace (e.g., a large send congestion rate limit). Therefore, to prevent congestion, the amount of time that the output buffer (or input buffer is the output buffer does not exist) is at capacity is monitored. The method examines how much space the plurality of data packets occupies with the addition of the new data packet and determines how full the output buffer is relative to its total capacity.

After operation 302, the method advances to operation 304 which calculates a percentage of time within the set time period where the output buffer is at full capacity. In this operation, the method compares the amount of time that the output buffer is at full capacity to the set time period. In one embodiment, the set time period is the time differential between the send times (e.g., the time difference between the time one data packet is sent and another data packet is sent). The percentage derived from dividing the amount of time to the set time period is the probability used in operation 304 to mark data packets indicating congestion.

Then the method advances to operation 305 where a probability that a data packet to be sent to a switch will be marked is determined. It should be appreciated that any suitable structure within a data transfer system may be configured to mark data packets. In one embodiment, the output buffer receives the data packet from the Infiniband target adapter through the input buffer and the switch may mark the data packet depending on a probability equal to the percentage of time that the output buffer (or the input buffer or both) is filled. It should be appreciated that any suitable type of method to indicate buffer capacity status may be utilized in the data congestion reduction method of the present invention such as, for example, using the probability method, etc. The percentage probability (x %) of being marked may also be known as a probability factor. It should be appreciated that the probability factor may be any multiple or mathematical function of a percentage of time the input buffer is at capacity. In one embodiment, when the buffer that is being monitored is full for x % of the set time period, a next data packet to be sent will have an x % probability of being marked. In one embodiment, code in the switch may set the probability factor. In this embodiment, the code utilizes a probability operation to determine whether a data packet should be marked.

In an exemplary embodiment, if the monitored buffer is full for 70% of the time in the set time period, the data packet sent by the switch has a 70% probability of being marked. Consequently, when the buffer is full more often, there is a correspondingly higher probability that the data packet sent will be marked. By this method, the data transfer rate may be controlled by the level of congestion of the data transfer system as monitored at the buffer. Therefore, the rate of marked data packets transmitted is directly correlated to the percentage of the set time period that the output and/or input buffer is full.

After operation 305, the method proceeds to operation 306 where the method determines if the probability indicates that the data packet will be marked. In this operation, the method utilizes the probability obtained in operation 305 (from the percentage of the time period that the monitored buffer is full) to ascertain whether or not the data packet is to be marked. In essence, data packets are randomly marked depending on the percentage time that the monitored buffer is at full capacity.

It should be understood that any suitable way of utilizing probabilities may be used to determine if a certain packet with a particular probability will be marked. In one embodiment, if there is a 70% probability that the data packet will be marked, a random number generator may be utilized to establish whether the 70% probability to mark the data packet has been met. In such an embodiment, code within the switch may be utilized to create a random number (a value generated by, for example, a random number generator) within a range of 1–100. In this exemplary embodiment, if the random number generated is within a range of 1–70 (because there is a 70% chance that a random number between 1 and 100 will be between 1 and 70), the switch will mark the data packet. On the other hand, if the random number generated is within the range of 71–100, the data packet is not marked by the switch. In another exemplary embodiment, if the data packet has a 20% probability of being marked (meaning the monitored buffer is full 20% of the set time period), the code within the switch will determine that a random number generated within the range of 1–20 (20% probability) results in the switch marking the data packet. If the random number generated is within the range of 21–80, the switch does not mark the data packet. If operation 306 determines that the data packet is to be marked, the method moves to operation 308 where a data packet is marked with data indicating congestion. It should be appreciated that the data packet may be marked in any suitable way to show data transfer congestion. In one embodiment, if the data packet is to be marked, operation 308 sets data in the header of the data packet (congestion indicator) showing that data congestion exists (e.g., that data is backing up in the input buffer because of data congestion). Therefore, later in the process, this marking enables an Infiniband target adapter to determine data transfer congestion and therefore decrease the CRL appropriately if congestion exists.

If operation 306 indicates that the data packet will be unmarked, the flowchart 204 ends and the method progresses to operation 206 of FIG. 3. Consequently, through this marking system, a feedback loop is created so the Infiniband target adapter may determine the level of data congestion within the data transmission system and react accordingly. In this way, congestion control is managed in a powerful manner using an intelligent feedback system.

Figure 5:
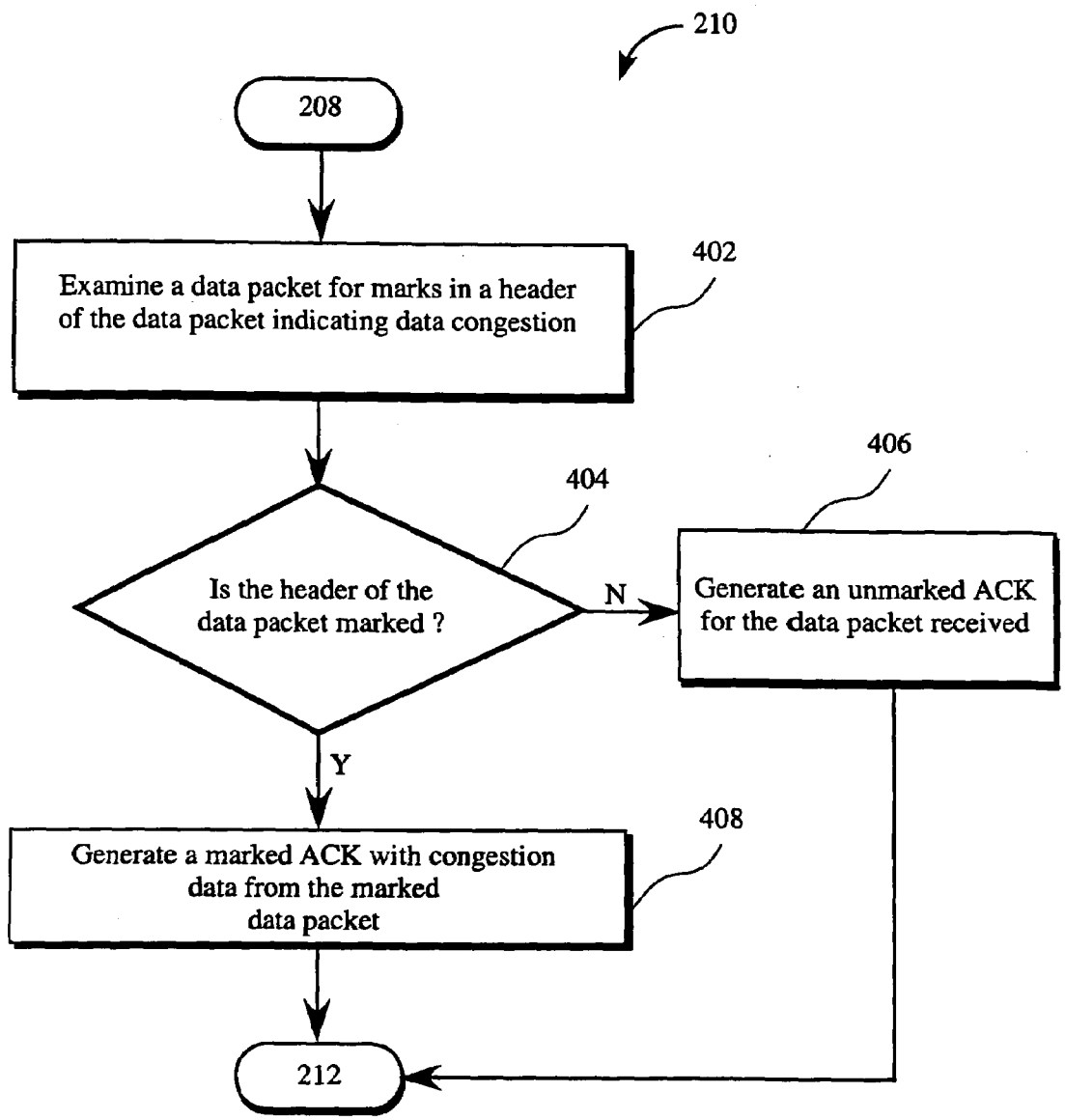
FIG. 5 shows a flowchart defining the generating of an ACK for the transferred data packet in accordance with one embodiment of the present invention.

FIG. 5 shows a flowchart 210 defining the generating of an ACK for the transferred data packet in accordance with one embodiment of the present invention. Flowchart 210 begins with operation 402 which examines a header of the data packet for marks in the data packet header indicating data congestion in a switch. In one embodiment, the header of the data packet is examined to determine if data transmission congestion exists. It should be understood that data congestion information may be located in any part of the data packet, including, for example, in any non-header portion of the data packet.

After operation 402, the method advances to operation 404 which determines if the data packet is marked. In one embodiment, the receiving Infiniband host analyzes the data packet to determine whether to generate a marked ACK or an unmarked ACK. It should be understood that other methods besides the use of ACKs may be utilized to determine data congestion. Therefore, the method described is flexible so any type of data transfer protocol may be utilized in conjunction with the present method to optimize data throughput.

If the data packet is not marked, the method moves to operation 406 where an unmarked ACK is generated for the data packet received. In one embodiment, when the data packet is received by the receiving Infiniband host, an acknowledgement data is sent back to the Infiniband target adapter. When there is no data congestion, the data packet is not marked so a generated ACK is not marked with congestion data. If the data packet is not marked, the flowchart 210 terminates at operation 406.

If the data packet is marked, the flowchart concludes with operation 408 where a marked ACK with congestion data from the marked data packet is generated. In operation 408, the marked ACK signifies that a corresponding data packet was marked with congestion data in the data packet header. In one embodiment, the ACK is marked in an ACK header indicating data packet marking which in turn indicates anticipated or actual data transfer congestion. In another embodiment, a congestion bit may be set which shows marking of a particular data packet. It should be appreciated that the ACK may be marked in any suitable way which would indicate data packet marking. As can be seen, an Infiniband target adapter may, through the use of data packet and ACK marking, determine the level of congestion of the data network, thus enabling optimization of data transfer throughput in a data transfer environment.

Figure 6:
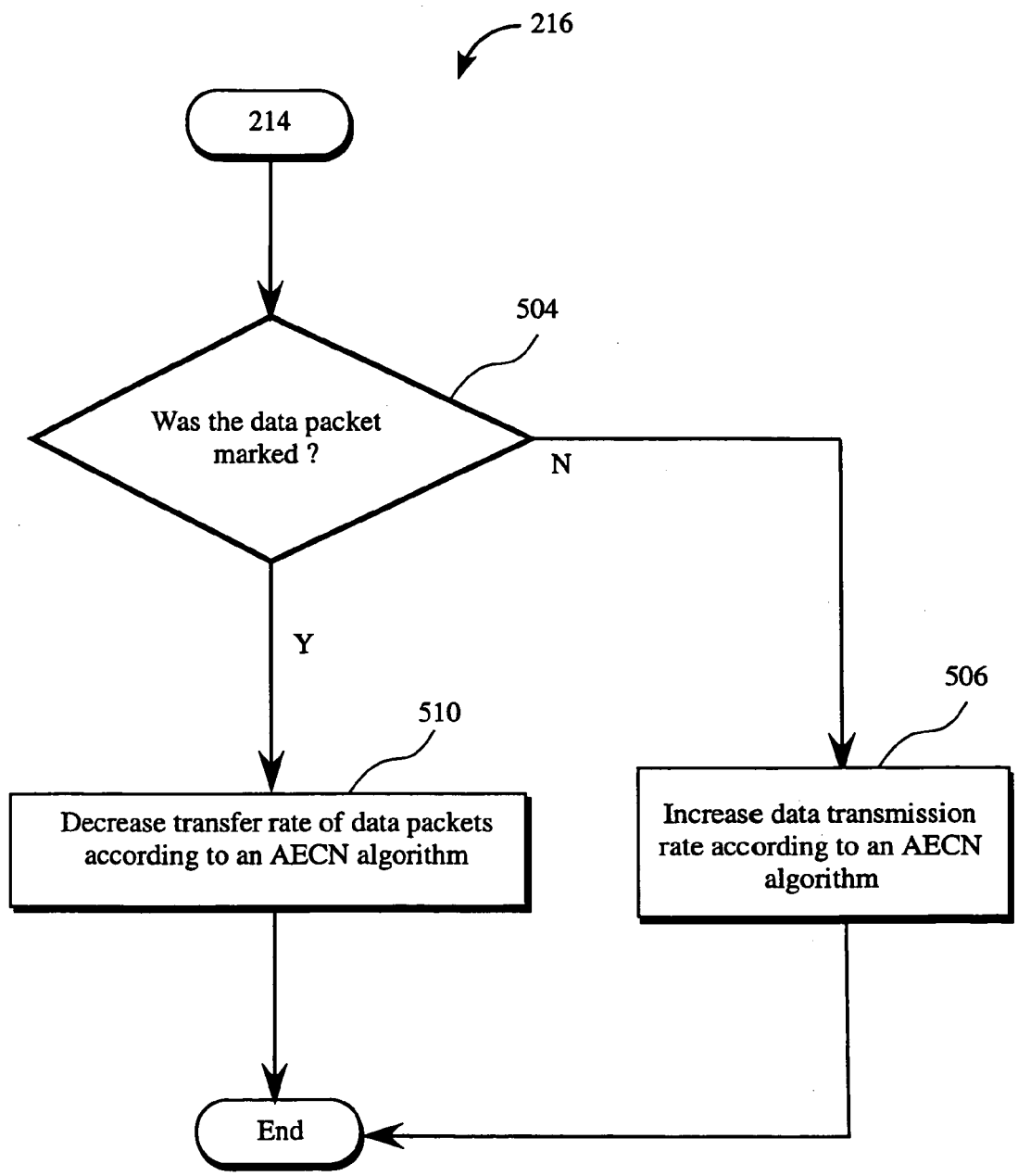
FIG. 6 shows a flowchart defining the method for adjusting a transfer rate of data packets in accordance with one embodiment of the present invention.

FIG. 6 shows a flowchart 216 defining the method for adjusting a transfer rate of data packets in accordance with one embodiment of the present invention. Flowchart 216 begins with operation 504 where it is determined if the data packet sent by the Infiniband host adapter was marked. It should be understood that the data packet may be any suitable type of data packet. In one embodiment, ACKs are generated by the receiving Infiniband host and sent to the Infiniband target adapter to be analyzed. The ACK (specifically the ACK header) is examined for a marked congestion bit showing that a specific data packet was marked. The ACK may contain data regarding the transmission of one data packet or multiple data packets.

In essence, the method determines if any data transfer congestion took place, because if an ACK for a particular data packet is not marked then that is indicative that the data packet was not marked with congestion data. If the data packet is not marked, the flowchart progresses to operation 506 which increases data transmission rate according to an AECN algorithm. If operation 504 showed that the data packet was marked, the method moves to operation 510 which decreases the data transfer according to the AECN algorithm.

It should be appreciated that the data transmission rate may be managed in any suitable way which would correlate to the level of data congestion in the transmission media as long as fairness principles (with regard to multiple hosts sending different amounts of data) are followed and data throughput is optimized. In the congestion reduction protocol described herein, the AECN reduces the rate of injection multiplicatively and increases it additively. The algorithms control the rate at which data is injected into the network, expressed as 4 KB packets per second. In one embodiment, the algorithms discussed below may be in the form of processing logic within firmware of the network interface card in a transmitting device. The target Infiniband host utilizes the algorithms to determine the data transmission rate. Two embodiments of the AECN algorithm are discussed below which involve a hybrid method and a rate based method of data transmission optimization.

In one embodiment, a hybrid window/rate data transfer determination algorithm may be used by the AECN data transmission optimization methodology. It should be understood that any suitable algorithm may be utilized within the AECN methodology framework to determine optimal data transfer decreases and data transfer increases in an Infiniband data transmission system. Initial Infiniband devices are expected to have relatively small buffers, only holding a half dozen or less MTUs worth of bytes. In Infiniband systems, usage of bytes as data units is preferable to using packets because in certain circumstances, the amount of data in flight may be less than one data packet. The number of bytes in a Sender's Maximum Segment Size (SMSS) (i.e., the maximum amount of data that may comprise one data packet) depends on the underlying network fabric. For Ethernet, it is typically one Ethernet Frame, while for InfiniBand it would be one maximal InfiniBand Packet, also referred to as the Maximum Transport Unit (MTU). Hence, in the following equations MTU will be utilized. Thus a minimum 2MTU size of CWND as used in Ethernet can still result in too much traffic being injected into the fabric. Therefore, CWND needs to be able to fall below 1 MTU, and when it does some means of limiting packet injection rates to an average of less than 1 MTU needs to be developed. What CWND is attempting to regulate is the average number of bytes traveling through the network at any given rate of packets covered by ACK time. The size of each InfiniBand packet is fixed by the IB specifications, so a CWND smaller than the desired packet would just stop transmissions. Consequently, a window/rate hybrid algorithm may be utilized to obtain an optimal data transmission rate. By use of such a hybrid algorithm, the packet may be sent but the sending of the next packet is delayed enough so that the amount of data averaged over the interval between sends is equal to CWND.

When the ACK is received, a value for a wait time (Twait) until the next data packet is sent can be calculated based on the number of excess bytes in flight before the ACK times the round trip time to the number of bytes below CWND in flight after the ACK. (The value of CWND to use is that from before any adjustment done at ACK time.) The formula to determine when the next packet is to be sent may be described by the following equation:

$$Twait = Tsend*(\text{in flight pre } ACK - CWND)/(CWND - \text{in flight post } ACK).$$

Or, putting it another way:

$$\text{Next Earliest Send Time} = (ACK \text{ coverage}/(CWND - \text{in flight post } ACK))*Tsend + \text{time of last packet send}.$$

In flight pre ACK is the number of packets in flight before the ACK is received. In flight post ACK is the number of packets in flight after the ACK is received. Tsend is the amount of time during which a data packet actually in flight. Thus, by delaying the next packet sent by an appropriate amount (i.e., Twait) after Tsend has ended, the average amount of bytes in flight is kept to less than or equal to the CWND value. When an ACK arrives and no congestion is indicated and CWND is less than or equal to SSTHRESH (i.e. slow start threshold) then the new send window (CWND') is indicated by:

$$CWND' = CWND + MTU.$$

A slow start threshold is a set amount of packets in flight where the data transmission rate is increased with every unmarked ACK if the CWND is under the SSTHRESH. If no congestion is indicated by the ACK and CWND is greater than SSTHRESH then the new send window is indicated by:

$$CWND' = CWND + (MTU/CWND)*MTU.$$

In the above equation, CWND' is a new send window after increasing the data transfer rate and CWND is a send window before increasing the data transfer rate. The CWND' in this case is an incremental increase where when examined over a RTT corresponds to an increase of an average of one MTU per RTT. Once CWND is greater than the SSTHRESH, data transfer is effectively increased every RTT that passes without a marked ACK. If congestion is indicated as shown by marked ACKs then the new send window is indicated by:

$$CWND' = \text{Bytes in flight} - K*(\text{bytes covered by } ACK).$$

The constant K has been introduced because simulations have shown that subtracting the full amount covered by the ACK may decrease CWND too drastically for the small amount of buffering, and hence the small number of outstanding bytes expected with Infiniband. Bytes covered by ACK are the data that is being acknowledged as having been successfully transmitted. It should be appreciated that the value for K may be any suitable value depending on the amount of buffering. Therefore, depending on the configuration of the switch and the network conditions, the value of K may be anywhere between 0.1 and 1. In a one embodiment, a value for K may be between about 0.4 and about 0.6, and in a preferable embodiment, the value for K may be about 0.5. Therefore, by varying the data transfer rate over a round trip time, an average data transfer rate over the round trip time may be less than or equal to a send window even when the send window is less than one packet per round trip time.

In another embodiment, a different algorithm using a purely rate based control method may be utilized to determine the send rate of data utilized by the target Infiniband host within the AECN framework. In such an embodiment, the rate based version of AECN for Infiniband is derived from the hybrid scheme presented above, but with a congestion rate limit register (CRL) rather than a congestion send limit window (a.k.a. CWND). Like the hybrid version, the rate based version of AECN reduces the rate of injection multiplicatively and increases it additively, over a window of time related to the RTT. However, the maximum permitted send rate is calculated directly from measured items, rather than indirectly from CWND.

The rate based algorithm controls the rate at which data is injected into the network, expressed in these formulas as bytes per second though other units, such as Infiniband flow control credits, could be used. The method utilizes a base amount of outstanding data which is called the Base Rate (BR). Like CWND, the CRL is used to set the actual rate of issue and is increased as transmission continues without dropped or marked packets. The algorithm is derived directly from the AECN Hybrid equations by dividing all values by an arbitrary time unit (say one second). Therefore, if no congestion indicated and CWND/sec is less than or equal to SSTHRESHIsec (i.e. slow start) then the new send rate is:

$$CWND'/\text{sec} = CWND/\text{sec} + MTU/\text{sec}$$

If no congestion indicated by the ACK and CWND greater than SSTHRESH then the new send rate is:

$$CWND'/\text{sec} = CWND/\text{sec} + (MTU/CWND)*MTU/\text{sec}$$

If congestion is indicated by the ACK then the new send rate is:

$$CWND'/\text{sec} = (\text{Bytes in flight})/\text{sec} - K^*(\text{bytes covered by ACK})/\text{sec}$$

CWND/sec is the congestion rate limit, or CRL, SSTHRESH/sec is also a rate which may be called SSRT (for Slow Start Rate Threshold) and MTU/sec is a constant which may be termed BR for Base Rate. The quantity (Bytes in flight)/sec is the actual rate, while (bytes covered by ACK)/sec is the send rate of the packet which is being acknowledged. Consequently, if no congestion indicated by the ACK and CRL is less than or equal to SSRT (i.e. slow start) then the new increased congestion rate limit is:

$$CRL' = CRL + BR$$

If no congestion is indicated by the ACK and CRL is greater than SSRT then the new increased congestion rate limit is:

$$CRL' = CRL + (BR/CRL)^*BR$$

If congestion is indicated by the ACK then the new decreased congestion rate limit is:

$$CRL' = \text{actual rate} - K^*(\text{rate of packets covered by } ACK)$$

The actual rate is an actual rate of issue of data, and the rate of packets covered by the ACK is the send rate of the packet which is being acknowledged. Explaining it a different way, the rate of packets covered by the ACK is the rate of data transmission that would account for the data transmitted for the period represented by the ACK. The constant K is again introduced because subtracting the full amount covered by the ACK may decrease CRL too drastically for the small amount of buffering, and hence the small number of outstanding bytes expected with Infiniband. It should be appreciated that the value for the constant K may be any suitable value depending on the amount of buffering. Therefore, depending on the configuration of the switch and the network conditions, the value of K may be anywhere between 0.1 and 1. In a one embodiment, a value for K may be between about 0.4 and about 0.6, and in a preferable embodiment, the value for K may be about 0.5.

Therefore, the new congestion rate limit reflects a decrease in the congestion rate limit by the actual amount of data congestion as determined by the monitoring of the data packets. Again, by varying the data transfer rate over time, an average data transfer rate over the round trip time may be less than or equal to one packet per round trip time.

Consequently, by use of either the hybrid or rate based algorithm, the AECN methodology enables timely notification to mitigate data transmission congestion. Additional embodiments may be practiced in accordance with the teachings of U.S. patent application Ser. No. 09/726,676 entitled "CONGESTION CONTROL FOR INTERNET PROTOCOL STORAGE" filed on Nov. 29, 2000. This patent application is hereby incorporated by reference.

FIGS. 7, 8, 9, and 10 illustrate embodiments of the present invention in the form of simulations quantifying the performance benefits of Infiniband utilizing AECN of the present invention versus simple Infiniband congestion control.

To validate that AECN can eliminate congestion spreading in Infiniband, a high level event driven simulation models of an Infiniband network were developed. The Infiniband network included up to 16 storage boxes connected through a switch to three hosts, and each group of four disks was connected through a shared session to one of the hosts. Since each box was assumed to hold 32 disks, there were eight total sessions which were distributed among the three hosts. Only the storage box to host data traffic (i.e. read traffic) was modeled, as that is the direction in which bottlenecks will occur with the assumed workload. All requests were in multiples of 4096 Bytes, with a size distribution corresponding roughly to a file server workload. Because the workload generated transfers that were multiples of 4 KB long, the Infiniband network, with an assumed Maximum Transport Unit (MTU) 4096 bytes, generated groups of full Infiniband Packets. The I/O traffic used as stimulus for the simulations was a statistically based block access workload of the sort that a file server would be expected to generate. This stimulus is then applied to a single switch, three host system with a skewed workload in which one of the hosts is connected through twice as many sessions to twice as many groups of disk drives. In other words, on each simulated 32 drive equivalent target, sixteen drives are connected through four sessions to the first, high demand host, eight drives are connected through two sessions to the second host and the final eight drives and two sessions are connected to the third host. The link to the heavy traffic host will saturate when a system with eight drive boxes (256 drives) is simulated. Ideally, it will not affect the other two host links, which will saturate at about 512 drives. In particular, a switch with one virtual link (VL) and sixteen kilobytes worth of receive buffer per port was simulated. The three output ports also have only one VL and sixteen kilobytes. Thus, each input and output port can hold four full size Infiniband packets. All of the measurements utilized to derive FIGS. 7, 8, 9, and 10 where done with simulations of a single switch based fabric. In such a situation, round trip time is quite short, so the congestion notifications produced by AECN are able to reach the Infiniband target adapter very quickly. The links of the Infiniband network were modeled at a 1 gigabit rate.

Figure 7:
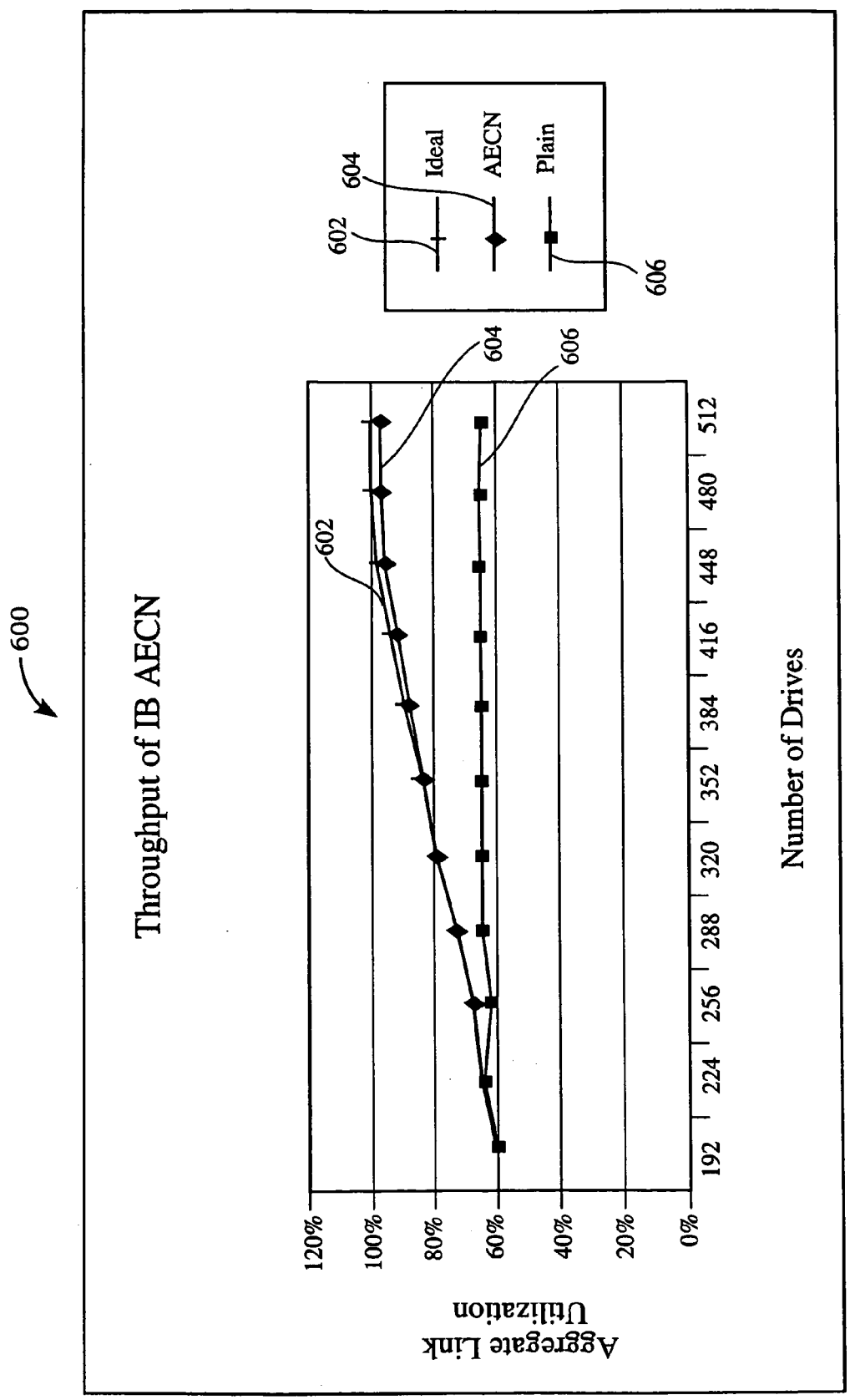
FIG. 7 illustrates a chart showing a rate based performance increase in accordance with one embodiment of the present invention.

FIG. 7 illustrates a chart 600 showing a rate based performance increase in accordance with one embodiment of the present invention. In general, the congestion control of the AECN provides nearly optimal performance, as indicated in FIG. 7. In FIG. 7, the potential Infiniband traffic if congestion spreading weren't a factor (Ideal) is compared to Infiniband without any congestion control (Plain) and the AECN algorithm extended to operate through dynamic rate control on Infiniband (rate control as described in reference to FIG. 5). An ideal line 602 shows the ideal situation where congestion spreading does not occur. A plain line 606 shows the situation where there is no congestion control which illustrates the lack of full link utilization compared with the ideal line 602. An AECN line 604 depicts the situation where the AECN algorithm is utilized to reduce congestion. The AECN line 604 is nearly identical with the ideal line 602 showing greatly enhanced data throughput as compared with the plain line 606. In fact, the AECN approach comes close to 100% throughput at 512 drives, and, in fact, allows transmission of nearly 100% of offered traffic at all points.

Figure 8:
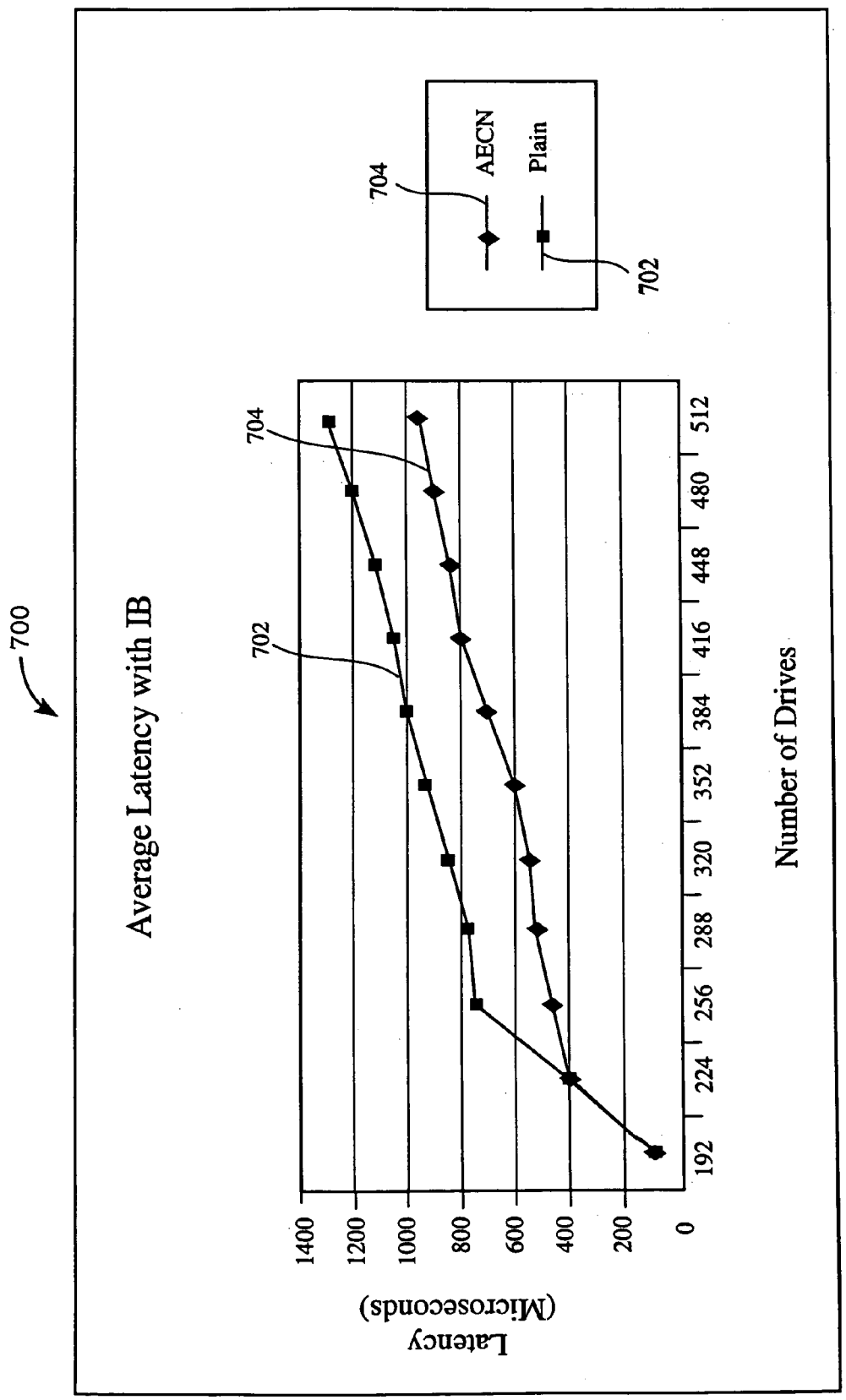
FIG. 8 shows an average latency chart of an Infiniband data transport network in accordance with one embodiment of the present invention.

FIG. 8 shows an average latency chart 700 of an Infiniband data transport network in accordance with one embodiment of the present invention. The chart 700 depicts latency in an Infiniband network. A plain line 702 signifying plain Infiniband without AECN dynamic rate control is shown in the chart 700. An AECN line 704 shows the average latency when the AECN algorithm is utilized to reduce data transport congestion in an Infiniband network. The decrease in latency is significant and therefore shows the enhanced data transport abilities of an Infiniband network utilizing the AECN algorithm to optimize data transport. Since the plain Infiniband system tends to block traffic on all links when congestion begins, it has the poor average latency. The AECN approach tends to prevent congestion spreading, thus keeping the latency low on the non-congested links.

Figure 9:
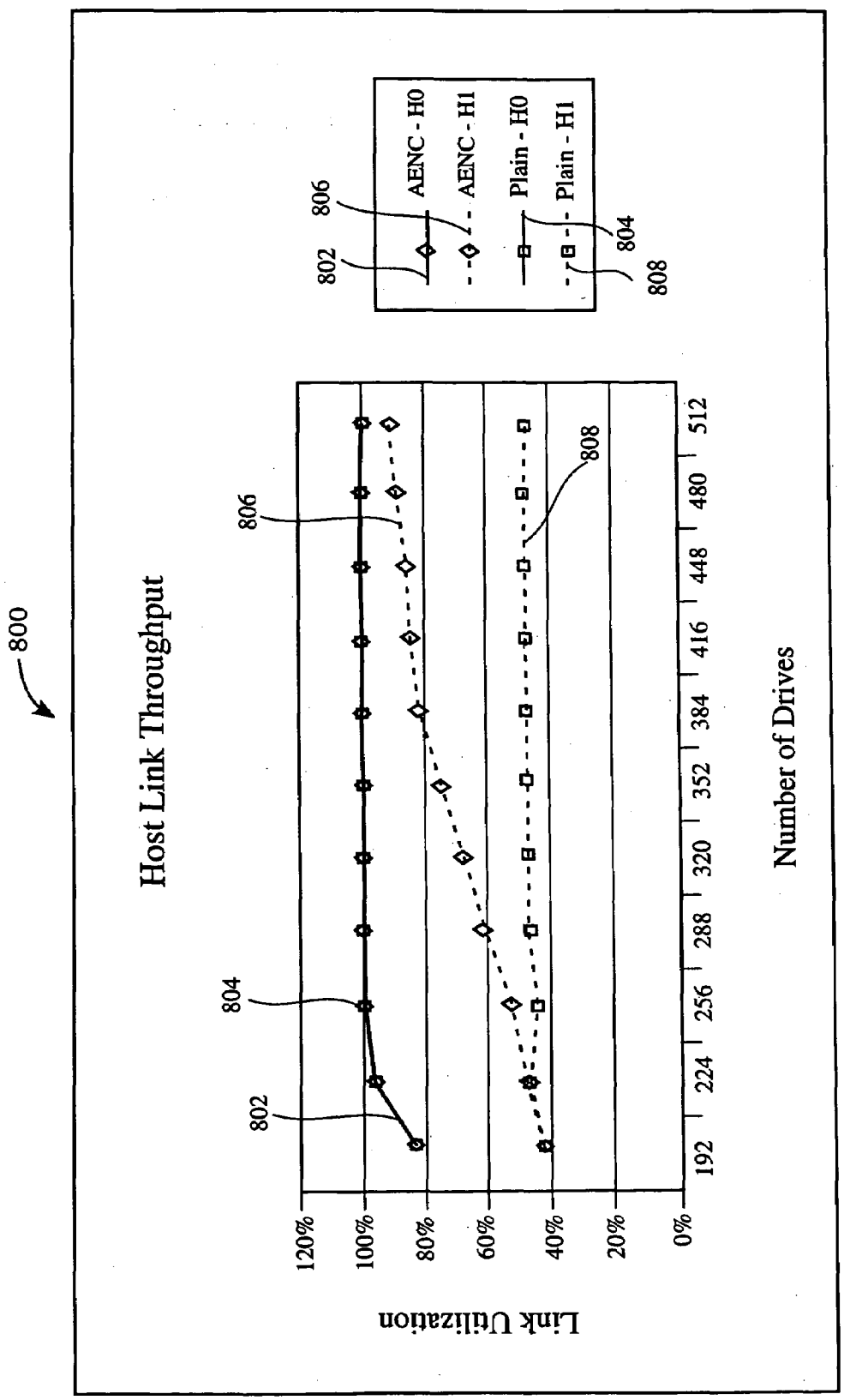
FIG. 9 shows a chart depicting host link throughput in an Infiniband network in accordance with one embodiment of the present invention.

FIG. 9 shows a chart 800 depicting host link throughput in an Infiniband network in accordance with one embodiment of the present invention. FIG. 9 shows throughput for a congested link to a host-0 and a throughput for one of the two non-congested links, (e.g. a link to host-1). Lines 802 and 806 illustrates link throughput to host-0 and host-1 respectively when the AECN dynamic rate control system is utilized. Lines 804 and 808 shows link throughput to host-0 and host-1 respectively when plain Infiniband is utilized. In this embodiment, the plain Infiniband network completely saturates the link to host-0, but holds the throughput on the link to host-1 to half what it could be, due to congestion spreading. The AECN approach is able to keep link-0 running at almost full capacity, while also letting link-1 carry nearly its full offered traffic.

Figure 10:
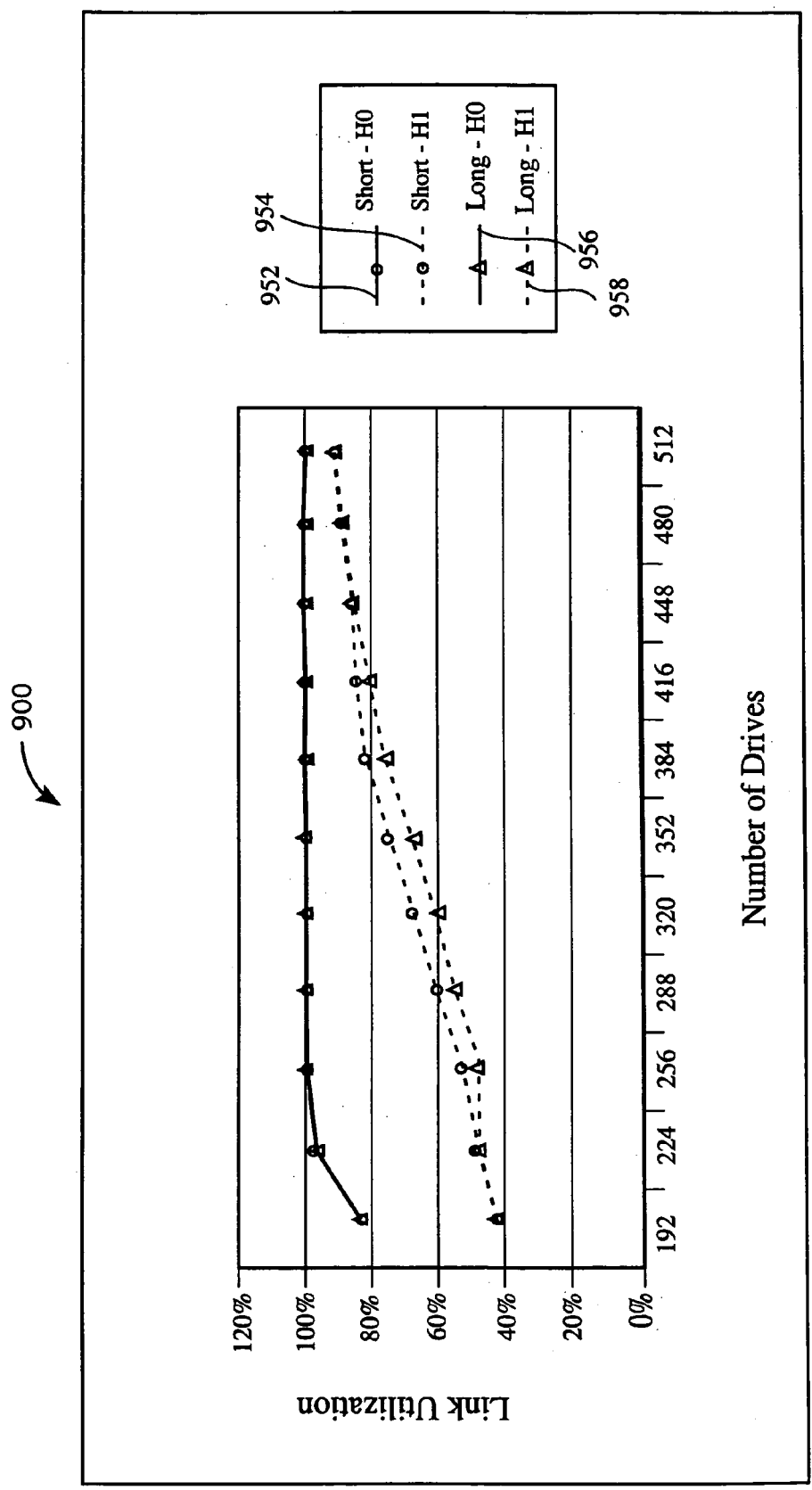
FIG. 10 shows a chart depicting comparison of short and long delay throughput in an Infiniband network utilizing AECN in accordance with one embodiment of the present invention.

FIG. 10 shows a chart 900 depicting comparison of short and long delay throughput in an Infiniband network utilizing AECN in accordance with one embodiment of the present invention. As the delay for congestion notifications to reach the sender increases, it takes longer for the algorithm to react, and allows congestion to temporarily spread to otherwise unsaturated links. Chart 900 includes lines 952 and 954 showing short delay throughput to the host-0 and the host-1 respectively. Lines 956 and 958 shows long delay throughput to the host-0 and the host-1 respectively. In chart 900 it is evident that host link-0, the congested link, is operating at or near saturation in both the long delay and short delay cases. The host link-1 throughput is only slightly less for the long delay network once host link-0 reaches saturation. Therefore, the link-1 throughput remains substantially higher than it would be with no ECN protocol in place, so there is significant benefit in implementing it.

The present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. A method for optimizing data transmission in a data transfer system, the data transfer system including a transmitting device that transmits data to a receiving device through a switch, comprising:

monitoring data transfer congestion in a buffer of the switch, the monitoring including marking the data when data transfer congestion is detected;

if data transfer congestion is detected,
marking an acknowledgement (ACK) data after the marked data is received by the receiving device;

transmitting the ACK data from the receiving device to the transmitting device; and adjusting a data transfer rate between the transmitting device and the receiving device based on data transfer congestion, the adjusting a data transfer rate including increasing the data transfer rate when the ACK data is not marked and decreasing the data transfer rate when the ACK data is marked;

wherein decreasing the data transfer rate is defined by using the following equation:

$$CRL'=\text{actual rate}-K*(\text{rate of packets covered by }ACK),$$

where CRL' is a new congestion rate limit;
where actual rate is an actual rate of issue of data.

2. A method for optimizing data transmission in a data transfer system as recited in claim 1, wherein increasing the data transfer rate which occurs when a congestion rate limit (CRL) is greater than a slow start rate threshold (SSRT) value is defined by using the following equation:

$$CRL'=CRL+(BR/CRL)*Br,$$

where CRL' is a congestion rate limit after a data transfer increase;
where BR is a base rate.

3. A method for optimizing data transmission in a data transfer system, the data transfer system including a transmitting device that transmits data to a receiving device through a switch, comprising:

monitoring data transfer congestion in a buffer of the switch, the monitoring including marking the data when data transfer congestion is detected, the monitoring data transfer congestion including marking the data according to a probability corresponding to a percentage of time that the buffer is full;

if data transfer congestion is detected,
marking an acknowledgement (ACK) data after the marked data is received by the receiving device;

transmitting the ACK data from the receiving device to the transmitting device;

if the ACK data is marked,
decreasing a data transfer rate multiplicatively between the transmitting device and the receiving device; and if the ACK data is unmarked,
increasing the data transfer rate additively between the transmitting device and the receiving device;

wherein decreasing the data transfer rate is defined by using the following equation:

$$CRL'=\text{actual rate}-K*(\text{rate of packets covered by }ACK).$$

4. A method for optimizing data transmission in a data transfer system as recited in claim 3, wherein the switch is an Infiniband based switch.

5. A method for optimizing data transmission in a data transfer system as recited in claim 3, wherein increasing the data transfer rate which occurs when a congestion rate limit (CRL) is greater than a slow start rate threshold (SSRT) value is defined by using the following equation:

$$CRL'=CRL+(BR/CRL)*BR.$$

6. A method for optimizing data transmission in a data transfer system as recited in claim 3, wherein the buffer is an output buffer in the switch.

7. A method for optimizing data transmission in a data transfer system as recited in claim 3, wherein the buffer is an input buffer in the switch.

8. A method for optimizing data transmission in a data transfer system as recited in claim 3, wherein K has a value between 0.1 and 1.

9. A method for optimizing data transmission in a data transfer system as recited in claim 3, wherein K has a value of 0.5.

10. A method for optimizing data transmission in a data transfer system, the data transfer system including a transmitting device that transmits data to a receiving device through a switch, comprising:

monitoring data transfer congestion in a buffer of the switch, the monitoring including marking the data when data transfer congestion is detected, the monitoring data transfer congestion including marking the data according to a probability corresponding to a percentage of time that the buffer is full;

if data transfer congestion is detected,
marking an acknowledgement (ACK) data after the marked data is received by the receiving device;
transmitting the ACK data from the receiving device to the transmitting device;
if the ACK data is marked,
decreasing a data transfer rate multiplicatively between the transmitting device and the receiving device; and
if the ACK data is unmarked,
increasing the data transfer rate additively between the transmitting device and the receiving device;
wherein increasing the data transfer rate which occurs when a congestion rate limit (CRL) is greater than a slow start rate threshold (SSRT) value is defined by using the following equation:

$$CRL'=CRL+(BR/CRL)*BR.$$

11. A method for optimizing data transmission in a data transfer system as recited in claim 10, wherein the switch is an Infiniband based switch.

12. A method for optimizing data transmission in a data transfer system as recited in claim 10, wherein the buffer is an output buffer in the switch.

13. A method for optimizing data transmission in a data transfer system as recited in claim 10, wherein the buffer is an input buffer in the switch.

14. A method for optimizing data transmission in a data transfer system, the data transfer system including a transmitting device that transmits data to a receiving device through a switch, comprising:

monitoring data transfer congestion in a buffer of the switch, the monitoring including marking the data when data transfer congestion is detected, the monitoring data transfer congestion including marking the data according to a probability corresponding to a percentage of time that the buffer is full;

if data transfer congestion is detected,
marking an acknowledgement (ACK) data after the marked data is received by the receiving device;
transmitting the ACK data from the receiving device to the transmitting device;
if the ACK data is marked,
decreasing a data transfer rate multiplicatively between the transmitting device and the receiving device; and
if the ACK data is unmarked,
increasing the data transfer rate additively between the transmitting device and the receiving device;
wherein decreasing the data transfer rate is defined by the following equation:

$$CWND'=\text{Bytes in flight}-K*(\text{bytes covered by }ACK).$$

15. A method for optimizing data transmission in a data transfer system as recited in claim 14, wherein increasing the data transfer rate which occurs when a send window is greater than an SSTHRESH value is defined by the following equation:

$$CWND'=CWND+(MTU/CWND)*MTU.$$

16. A method for optimizing data transmission in a data transfer system as recited in claim 14, wherein K has a value between 0.1 and 1.

17. A method for optimizing data transmission in a data transfer system as recited in claim 14, wherein K has a value of 0.5.

18. An Infiniband switch to be used in a network system, the Infiniband switch defining a connection between a transmitting device and a receiving device, the Infiniband switch comprising:

an input buffer for receiving data from the transmitting device;
an output buffer for receiving data from the input buffer and delivering the data to the receiving device;
firmware having processing logic for monitoring congestion at the output buffer, the processing logic being configured to mark the data being communicated to the receiving device according to probability that congestion exists, the receiving device being configured to mark acknowledgement packets being communicated to the transmitting device when the data is marked, the transmitting device being configured to decrease data transmission rate upon receipt of marked acknowledgement packets and increase data transmission rate upon receipt of un-marked acknowledgement packets;
wherein the transmitting device decreases data transmission as defined by the following equation:

$$CRL'=\text{actual rate}-K*(\text{rate of packets covered by }ACK).$$

19. An Infiniband switch to be used in a network system as recited in claim 18, wherein the transmitting device increases the data transmission rate as defined by the following equation when a congestion rate limit (CRL) is greater than a slow start rate threshold (SSRT) value:

$$CRL'=CRL+(BR/CRL)*BR.$$

20. An Infiniband switch to be used in a network system as recited in claim 18, wherein the processing logic marks data packets from the output buffer according to a probability corresponding to a percentage of time that the buffer is full.

21. An Infiniband switch to be used in a network system, the Infiniband switch defining a connection between a transmitting device and a receiving device, the Infiniband switch comprising:

an input buffer for receiving data from the transmitting device;
an output buffer for receiving data from the input buffer and delivering the data to the receiving device;

firmware having processing logic for monitoring congestion at the output buffer, the processing logic being configured to mark the data being communicated to the receiving device according to probability that congestion exists, the receiving device being configured to mark acknowledgement packets being communicated to the transmitting device when the data is marked, the transmitting device being configured to decrease data transmission rate upon receipt of marked acknowledgement packets and increase data transmission rate upon receipt of un-marked acknowledgement packets;

wherein the transmitting device decreases data transmission as defined by the following equation:

$CWND'$=Bytes in flight$-K*$(bytes covered by $ACK$).

22. An Infiniband switch to be used in a network system as recited in claim 21, wherein the transmitting device increases data transmission rate as defined by the following equation when a congestion rate limit (CWND) is greater than a slow start rate threshold (SSTHRESH) value:

$CWND'=CWND+(MTU/CWND)*MTU.$

23. An Infiniband switch to be used in a network system as recited in claim 21, wherein the processing logic marks data packets from the output buffer according to a probability corresponding to a percentage of time that the buffer is full.

* * * * *